Patented Aug. 27, 1929.

1,726,403

UNITED STATES PATENT OFFICE.

GUSTAVE S. MATHEY, OF ELIZABETH, NEW JERSEY, ASSIGNOR TO JOHNSON & JOHNSON, OF NEW BRUNSWICK, NEW JERSEY, A CORPORATION OF NEW JERSEY.

PLASTER OF PARIS BANDAGE AND METHOD OF MAKING IT.

No Drawing.   Application filed February 4, 1927. Serial No. 166,029.

Heretofore it has been more or less standard practice in the manufacture of plaster of Paris bandages to apply the plaster to gauze, muslin, or the like open mesh fabric, in dry powdered form either by rubbing or pressing the plaster into the fabric or by cradling, that is to say by running the fabric through a mass of powdered plaster. Sometimes the fabric was manifolded and sometimes it was in the form of a tubular casing. This practice suffers many disadvantages. It is messy; the plaster of Paris adheres to the fabric unevenly causing irregular, lumpy, or non-uniform distribution when immersed in water preparatory to the cast, and plaster on the outer layers and next to the core of the bandage falls into the water, thus weakening that part of the bandage. The time required for immersion is comparatively long because as soon as a portion of the bandage is wetted it sticks and becomes a barrier to rapid penetration of water to the interior. Before the cast can be made, the irregular patches or lumps must be smoothed out and notwithstanding the skill or dexterity of the surgeon it not infrequently happens that premature setting takes place.

Various attempts have been made from time to time to improve upon the dry practice. For example, it was proposed many years ago to prepare the plaster in the form of a spread for application to the fabric, but this involved the use of india rubber or gutta percha which hardened with time and so prevented the passage of water. Subsequently, a corrective was attempted in the compounding of plaster of Paris with gelatine, acetic acid and water, but this practice also was abandoned because the resulting product was not stable and hardened only with difficulty. Hence, it is a fact that notwithstanding the manifest disadvantages of the so-called dry method it yet remains the universal practice.

After extended experimentation, I have perfected a compound and method of application whereby I am enabled to fabricate plaster of Paris bandages characterized by their freedom from the difficulties and disadvantages of the old practice in that the plaster of Paris is present in the form of a dense, smooth, uniform, flexible coating readily and unformly penetrable by water; the bandage is stable and will not deteriorate with age or break down in shipment; its stability reduces the time required for immersion, and makes it possible for one operator to immerse, squeeze and apply the bandage irrespective of whether it be of the quick setting or slow setting type; and the final cast is neater, stronger and lighter than corresponding casts of the old practice.

The nature of the invention consists in compounding plaster of Paris in powdered state with an aqueous mixture containing suitable adhesives and a volatile substance calculated to prevent or retard premature crystallization or hardening of the plaster, for the purpose and with the result of producing a creamy paste which is spread as such in an even layer over open mesh fabric and dried naturally or artificially whereupon the coated fabric is cut into suitable lengths and widths for bandage purposes.

To enable others skilled in the art to understand and practice my invention, reference is had to the following typical mode of procedure:

For a batch containing ten pounds of plaster, I prepare an aqeous solution of dextrine and sugar in the proportion of about three pounds of water, three ounces of sugar and six ounces of dextrine. This is heated to boiling temperature and then cooled, whereupon I add two pounds of acetic acid. The office of the latter is to prevent or retard the setting until the water used in making the mixture has evaporated. The retardant, whatever it may be, should be volatile so that it will pass out of the mixture concurrently with the evaporation of the water, thus maintaining the relative proportions of retardant and water throughout the drying process. Examples of other suitable retardants are alcohol, formic acid, ammonia, hydrochloric acid, formaldehyde, aliphatic acids up to and including propionic acid and their halogen derivatives, aliphatic alcohols up to and including butyl alcohols and their halogen derivatives, chloral, acetoacetic acid, acetol, acetone and other aliphatic ketones, acetoxime, aldehyde ammonia, diacetal, halogen aliphatic ketones, aliphatic amines, ethyl hydrazine, furfurol alcohol, methylal and hydrazine, and of the inorganic retarders besides hydrochloric acid any of the other halogen acids may be used. The mixture is then ready for the introduction of the plaster of Paris, which I charge in dry powdered form, while thoroughly stirring the mass. The product of this treatment is of the nature of a readily spreadable mass or creamy paste and is applied as a coating in regulable and uniform quantities on gauze, crinoline or the like fabric. The cream enters and fills the voids or openings of the fabric establishing thereby potential keys or interlocks which aptly aid the inherent adhesive properties of the coating in fixating the latter with relation to the fabric. The spreading of the cream may be uniformly and expeditiously performed by well known devices requiring no detailed description. After this has been accomplished, the coated fabric is dried by exposure to room temperature or the drying action may be accelerated by forced measures of well known and approved type. The coated material is then cut into suitable lengths and widths for bandage purposes.

The new product is free from dust, will not chip or crack, and its pronounced flexibility, notwithstanding the hard firm coating, enables it to be rolled or otherwise packed without the exercise of the extreme care necessary under the old practice. It also works definite economies from a manufacturing standpoint in that its clean and stable qualities tend towards simplification and coordination of manufacturing steps.

From a usage standpoint, it will appeal to the surgeon because he can do all the manipulating that is necessary without the annoyance or bother of assistants. It has the further appeal in the added strength due to the presence of an effective adhesive or bonding agent which holds the plaster material in the meshes of the fabric throughout the immersion period and thus enables the surgeon to make a smooth, strong and otherwise perfect cast.

While in the example of procedure I have mentioned an appropriate adhesive. it is manifest that other bonding substances are available and will readily suggest themselves to the expert in the light of my disclosure. Examples are dextrines, sugars, gum arabic, starch, etc. singly or combined. I prefer, however, to use a mixture of dextrine and sucrose.

While I have described my invention as embodied in a plaster of Paris bandage, it, obviously, has utility when embodied in a splint or other surgical cast.

Having described my invention and the manner in which it may be performed, I claim:—

1. Material for surgery casts, consisting of foundation fabric, and a firm homogeneous coating of casting material, said coated fabric capable of being rolled and otherwise manipulated without the hazard of disintegration, said coating consisting of a compound of powdered plaster of Paris, a cooked water soluble adhesive, and a volatile retardant, said coating being stable over long periods of time and uniformly responsive to casting on the application of water.

2. The method of making stable, dustless, non-chipping plaster of Paris bandage material, which consists in bonding dry plaster of Paris in powdered form with an aqueous solution of adhesive material which has been boiled and to which has been added a volatile retardant for the purpose and with the result of reducing the plaster to the state of a cream having adhering properties, applying it in that state to a foundation fabric, and drying the coated fabric.

3. The method of making stable dustless non-chipping plaster of Paris bandage material, which consists in mixing powdered plaster of Paris with a previously cooked aqueous solution of adhesive material and a volatile retardant, for the purpose and with the result of reducing the plaster to paste form, applying the mixture as a coating to foundation fabric, and permitting it to dry under conditions whereby the relative proportions of water and retardant are maintained throughout the drying process.

4. The method of making non-disintegrable surgical casting material, which consists in boiling an aqueous solution of dextrine and sugar, cooling same, adding acetic acid, and effecting a mixture of the compound and powdered plaster of Paris to reduce the latter to a spreadable cream, and applying the cream to foundation fabric.

5. As an article of manufacture, a casting bandage, comprising gauze encrusted without loss of flexibility with casting material of stable characteristics and of limited maximum thickness whereby the gauze may be rolled or folded without appreciable disintegration of the encrusting material, said encrusting material consisting of powdered plaster of Paris, a cooked water soluble adhesive and a volatile retardant, said encrusting material being uniformly penetrable to water throughout its extent whereby it is available for quick or slow casting without balling or lumping and without additions of powdered material.

In testimony whereof I affix my signature.

GUSTAVE S. MATHEY.